Oct. 21, 1947.  H. J. RUDOLPH  2,429,297
VIBRATION ABSORBER
Filed Nov. 5, 1945  2 Sheets-Sheet 2
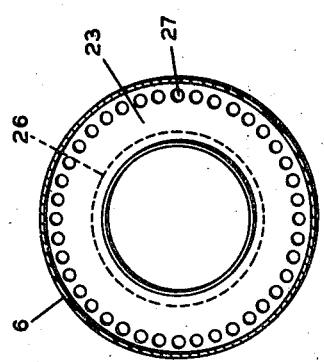
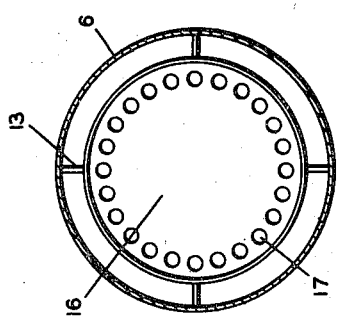
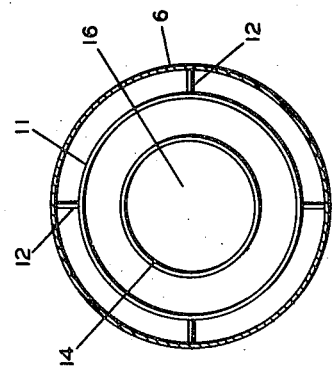
INVENTOR.
H. J. RUDOLPH
BY Hudson & Young
ATTORNEYS Patented Oct. 21, 1947

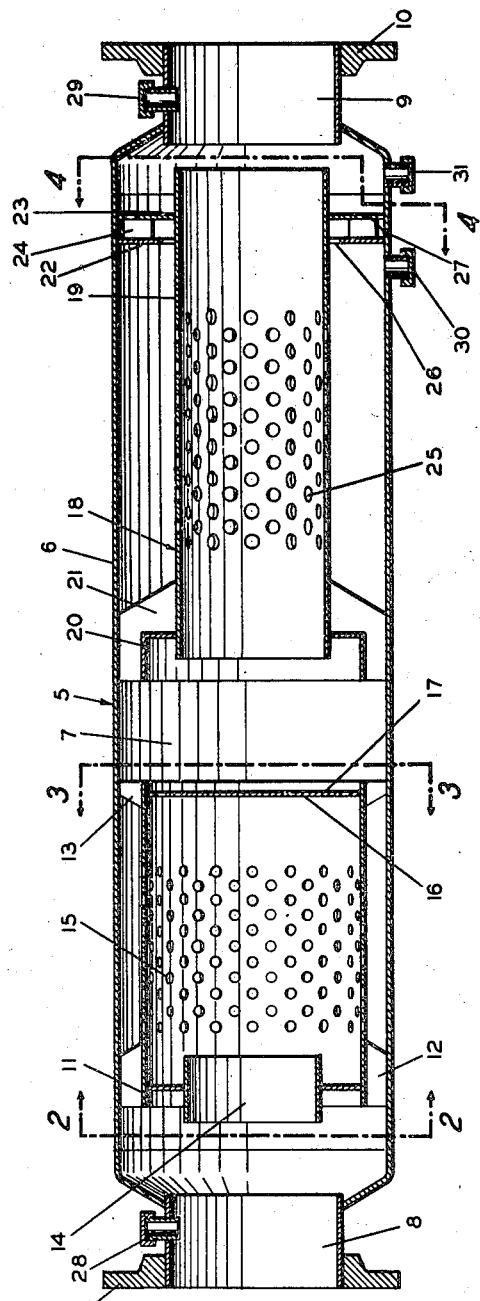

2,429,297

UNITED STATES PATENT OFFICE 2,429,297

VIBRATION ABSORBER

Herman J. Rudolph, Clovis, N. Mex., assignor to Phillips Petroleum Company, a corporation of Delaware Application November 5, 1945, Serial No. 626,623

6 Claims. (Cl. 138—26)

This invention relates to vibration absorbers. In a more specific aspect it relates to auxiliary devices to be used with gas compressors for the purpose of subduing gas pulsations created by said compressors, and for substantially eliminating destructive mechanical vibrations and/or reducing noise in the compressed gas discharge lines connected to said compressors. The elimination of mechanical vibration, which tends to destroy parts of the plant, is generally regarded as more important than the reduction of noise.

One object of the invention is to provide a device for reducing vibrations, or for absorbing vibrations.

Another object is to provide a smooth flowing gas stream from compressors.

Another object is to provide a vibration absorber with connections for testing the operation of the vibration absorber.

Another object is to provide a vibration absorber with means for removing condensate therefrom.

Another object is to provide a vibration absorber having suitable areas at all points whereby surging of the gas is quickly eliminated and the pulsations smoothed out into a steady flow of gas.

Another object is to provide a simple, easily constructed, inexpensive, fool proof vibration absorber.

Numerous other objects and advantages will be apparent to those skilled in the art upon reading the accompanying specification, drawings and claims.

In the drawings:

Figure 1 is an elevational, cross sectional view through a vibration absorber embodying the present invention.

Figure 2 is a cross sectional view of the structure of Figure 1 taken along the line 2—2, looking in the direction indicated.

Figure 3 is a cross sectional view of the structure of Figure 1 taken along the line 3—3, looking in the direction indicated.

Figure 4 is a cross sectional view of the structure of Figure 1 taken along the line 4—4, looking in the direction indicated.

In Figure 1 the vibration absorber generally designated as 5 consists of a housing 6 having an enlarged chamber 7, inlet 8, and outlet 9. The vibration absorber may be provided with flanges 10 or other means for inserting it in an exhaust pipe.

In side housing 6 is a perforated cup baffle 11 spaced from the walls of housing 6 by fins 12 and 13. Cup baffle 11 may be regarded as an enlarged chamber and has restricted inlet opening 14 for receiving gas from 8. The walls of 11 are perforated with holes 15 and the bottom 16 of chamber 11 has a row of perforations 17 preferably disposed around the periphery.

Spaced in chamber 7 behind 16 with relation to inlet 8 is a funnel generally designated as 18. Funnel 18 is composed of pipe 19 and head 20. Funnel 18 is spaced from wall 6 by fins 21 and by plates 22 and 23 in combination with fins 24. Pipe 19 is perforated in the area shown with holes 25.

Plate 22 is secured at its outer edge to the wall of housing 6, but has an annular space 26 between it and pipe 19; whereas, plate 23 is secured at its inner end to pipe 19 and has a series of holes 27 adjacent wall of housing 6. The area of annular space 26 and of all of the holes 27 is preferably substantially the same.

Nipples 28 and 29 are provided for the attachment of pressure gages and drain nipples 30 and 31 are provided for draining condensate from vibration absorber 5.

Operation

The gas enters in the form of violent pulses through inlet 8. The area of 14 is smaller than the area of 8, but when combined with the annular area between 6 and 11, it is greater than area 8. Therefore, the gas pulses coming in 8 are easily taken care of by passing through 14 or outside of 11. The area of holes 15 and 17 is greater than the area of 14, so pressure waves cannot reflect in chamber 11.

The gases having passed through 11 are fairly well mixed and in some cases this would be a sufficient vibration absorber. However, I prefer to have the additional funnel member 18.

The area inside pipe 19 plus the annular area between 6 and 20 is greater than the annular area between 11 and 6 plus the area of holes 17 so the gas has ample opportunity to pass inside or outside of funnel 18. The gas passing outside 18, however, finds the area of 26 or 27 too restricted and much of this gas is forced in through holes 25 to the interior of pipe 19.

The area of holes 25 plus the area of 26 is smaller than the area of outlet pipe 9 so the outlet pipe is able to take care of the gases. By the time the gases reach the outlet pipe, the pulsations have been eliminated.

From time to time, nipples 30 and 31 are opened to drain out condensate. However, a pipe may be attached to these nipples and run off to chambers or other means of disposal.

By attaching a pressure gage at 28 and one at 29 (pressure gage not shown), it is easy to observe the operation of the vibration absorber as a gas at 8 will fluctuate violently while that at 29 will be substantially steady. Nevertheless, the pressure reading of the two gases will be very close together as there is no undue throttling of the flow, but merely an elimination of the pulsation.

Nipples 28 and 29 remain closed except when it is desired to test the vibration absorber. If gages at 28 and 29 show too great a pressure drop then the vibration absorber needs cleaning. If the gage at 29 begins to jump, it indicates something has been blown out of the vibration absorber, such as plate 16.

The reduction in vibration is a very valuable result of the present invention, as the type of vibration created by large compressors without using the present invention has been found quite destructive, especially after a period of time has passed sufficiently for pipes and other plant parts which are subjected to the vibration to crystallize due to what is called fatigue, and break.

Formal changes may be made in the specific embodiment of the invention directed without departing from the spirit and substance of the broad invention, the scope of which is commensurate with the appended claims.

Having described my invention, I claim:

1. A vibration absorber comprising in combination a housing having an inlet and an outlet, an enlarged chamber in the housing, a baffle chamber in said enlarged chamber having walls spaced from said housing, said baffle chamber having a restricted opening disposed to receive a portion of the gases entering said inlet, and having a bottom, perforations in said walls and in said bottom, a perforated pipe mounted in said enlarged chamber behind said bottom from said inlet, said pipe being spaced from the walls of said housing, an annular baffle plate secured to the inlet end of said pipe and extending toward the walls of said housing, the exterior edge of said annular plate being turned toward said inlet and being the same distance from said housing as said baffle chamber, a plurality of baffle rings between said housing and the outlet end of said pipe, a test connection in the inlet and outlet and condensate drain plugs in said enlarged chamber.

2. A vibration absorber comprising in combination a housing having an inlet and an outlet, an enlarged chamber in the housing, a baffle chamber in said enlarged chamber having walls spaced from said housing, said baffle chamber having a restricted opening disposed to receive a portion of the gases entering said inlet, and having a bottom, perforations in said walls and in said bottom, a perforated pipe mounted in said enlarged chamber behind said bottom from said inlet, said pipe being spaced from the walls of said housing, and an annular baffle plate secured to the inlet end of said pipe and extending toward the walls of said housing, the exterior edge of said annular plate being turned toward said inlet and being the same distance from said housing as said baffle chamber.

3. A vibration absorber comprising in combination a housing having an inlet and an outlet, an enlarged chamber in the housing, a baffle chamber in said enlarged chamber having walls spaced from said housing, said baffle chamber having a restricted opening disposed to receive a portion of the gases entering said inlet, and having a bottom, perforations in said walls and in said bottom, a perforated pipe mounted in said enlarged chamber behind said bottom from said inlet, said pipe being spaced from the walls of said housing, and an annular baffle plate secured to the inlet end of said pipe and extending toward the walls of said housing.

4. A vibration absorber comprising in combination a housing having an inlet and an outlet and an enlarged chamber therebetween, a perforated cup baffle in said chamber the inlet area of said cup being smaller than the area of said inlet and less than the outlet area of said cup, but the annular area around said cup plus the inlet area of said cup being greater than the area of said inlet, and a funnel in said chamber, the large end of said funnel being toward the inlet, baffle means between the small end of said funnel and said chamber, said funnel being perforated between the large end and the small end, the area of the annular space around said funnel plus the area of the small end of said funnel being greater than the annular area around said cup plus the area of the perforations in the bottom of said cup, the area of the small end of said funnel being greater than the area of the perforations in said funnel and the area of the small end of said funnel plus the area of openings thereabout being less than the area of said outlet.

5. A vibration absorber comprising in combination a housing having an inlet and an outlet and an enlarged chamber therebetween, a perforated cup baffle in said chamber and a funnel in said chamber, the large end of said funnel being toward the inlet, baffle means between the small end of said funnel and said chamber, said funnel being perforated between the large end and the small end.

6. A vibration absorber comprising in combination a housing having an inlet and an outlet and an enlarged chamber therebetween, a perforated cup baffle in said chamber the inlet area of said cup being smaller than the area of said inlet and less than the outlet area of said cup, but the annular area around said cup plus the inlet area of said cup being greater than the area of said inlet.

HERMAN J. RUDOLPH.

REFERENCES CITED

The following references are of record in the file of this patent:

UNITED STATES PATENTS

| Number | Name | Date |
|---|---|---|
| 360,326 | Richert | Mar. 29, 1887 |
| 696,277 | Sponseller et al. | Mar. 25, 1902 |
| 2,401,570 | Koehler | June 4, 1946 |